Figure 1:
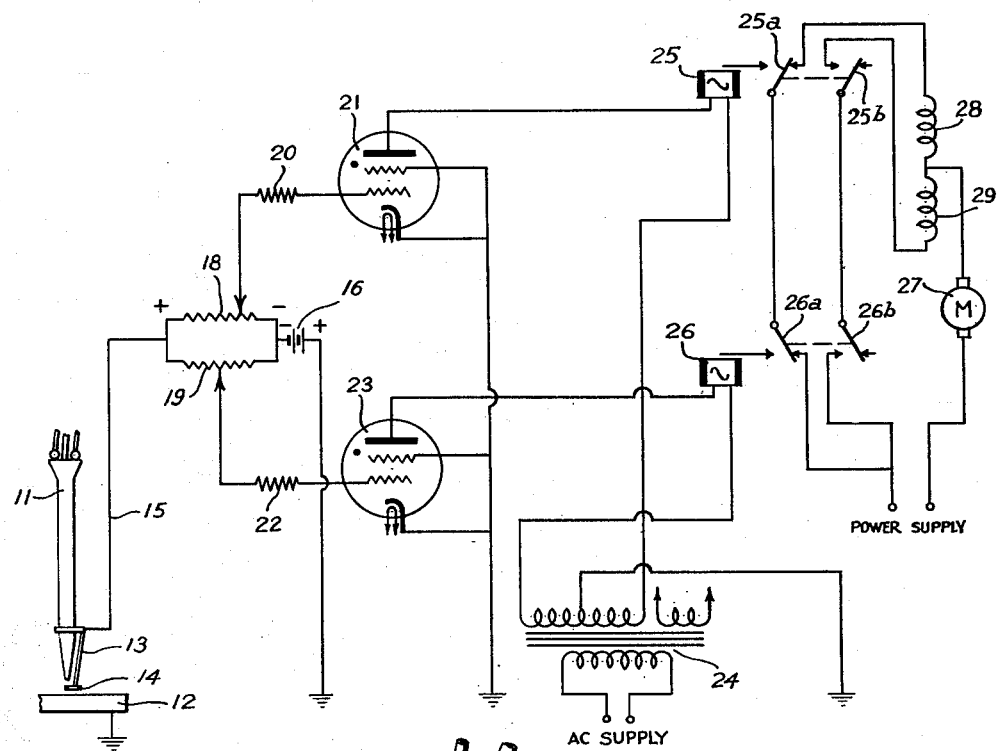

Dec. 19, 1950         G. M. DEMING         2,534,958
METHOD AND APPARATUS FOR CONTROLLING TORCH SPACING
Filed Jan. 14, 1947

INVENTOR
George M. Deming, deceased
Leonard G. Brown
Administrator
By Pennie, Edmonds, Morton, & Barrows
ATTORNEYS Patented Dec. 19, 1950

2,534,958

UNITED STATES PATENT OFFICE 2,534,958

METHOD AND APPARATUS FOR CONTROLLING TORCH SPACING

George M. Deming, deceased, late of Orange, N. J., by Leonard G. Brown, administrator, South Orange, N. J., assignor to Air Reduction Company, Incorporated, a corporation of New York Application January 14, 1947, Serial No. 721,891

3 Claims. (Cl. 148—9)

This invention relates to a method and apparatus for controlling the spacing between the tip of a gas torch and the surface of a workpiece that is being cut, welded, or otherwise acted upon by the torch.

In mechanical cutting, welding, or heat-treating apparatus it is desirable to maintain the tip of the gas torch a substantially constant distance from the work-piece regardless of irregularities in the work surface. Various means have been proposed for accomplishing this, such as a guide roller that runs on the work surface and supports the torch, or an electrical system for automatically maintaining the torch spacing constant.

One electrical system for this purpose is disclosed in the patent to Chester Mott et al. No. 2,364,645, issued December 12, 1944. The present invention is an improvement on the method and apparatus of that patent.

A torch flame is electrically conductive, and assuming other factors remain constant, the conductivity of the flame decreases with increase in the length of the flame and vice versa. In the method of the Mott et al. patent the change in conductivity of the flame caused by its change in length when the torch spacing departs from the desired normal is made use of to automatically maintain the torch spacing substantially constant. An electric current is passed through the torch flame and between the torch tip and the work surface and the torch is automatically moved toward and away from the work surface in accordance with changes in the conductivity of the flame to keep the spacing of the torch tip substantially at the desired normal.

As above stated, the conductivity of a torch flame varies inversely with its length only if other factors remain constant. There are many factors that can affect the conductivity of the flame such as the ratio of the gas mixture that feeds the flame and the diameter of the flame and in practice it has been difficult to maintain these factors near enough to constants to make a system such as that disclosed in the Mott et al. patent practical.

The principal object of this invention is to provide an electrical system for controlling torch spacing that operates on the same general principle as that disclosed in the Mott et al. patent but which is more practical.

Another object is to provide an improved method and apparatus for automatically maintaining the spacing between a gas torch and the workpiece at a substantially constant predetermined value regardless of irregularities in the work surface.

A further object is to provide a method of automatically maintaining substantially constant torch spacing by utilizing the conductivity of the torch flame and in which the influence on the conductivity of the flame of the factors other than the length of the flame are rendered negligible or are greatly insubordinated to the influence that the flame length has on the flame conductivity.

According to the invention an electron emissive element, or electrode, is placed in the torch flame to emit electrons when heated by the flame and thus reduce the electrical resistance of the flame. The electrode is preferably made of tungsten, but any other material that emits electrons readily when at an elevated temperature, and that can withstand the flame temperature, is satisfactory for the electrode. The conductivity of the flame itself is relied upon to complete an electric circuit from the electrode to the work and the torch is automatically moved toward and away from the work surface in accordance with variations in the conductivity of the flame caused by changes in its length as the torch spacing departs from the desired normal. However, as explained above, it is difficult to maintain the conductivity of the flame constant for a given torch spacing. By using the tungsten electrode the resistance between the electrode and work for a given spacing is greatly reduced. The low resistance path supplied by the electrons emitted from the electrode may be considered the equivalent of a low resistance ($r$) in parallel with the resistance of the flame ($R$), a high resistance. In a two-branch parallel electric circuit the equivalent resistance $R_T$ is expressed by $$R_T = \frac{Rr}{R+r}$$

where $R$ and $r$ represent the resistances of the individual branches. From this it is obvious that if $R$ is considerably larger than $r$, $R_T$ approaches $r$, and large variations in $R$ have little effect on $R_T$.

Therefore, for any given torch spacing the variations in the resistance of the flame caused by gas proportions, flame diameter, etc., become negligible. Thus the overall resistance between the torch and the work is affected very little except by the spacing and now may be reliably used to control torch spacing.

Figure 2:
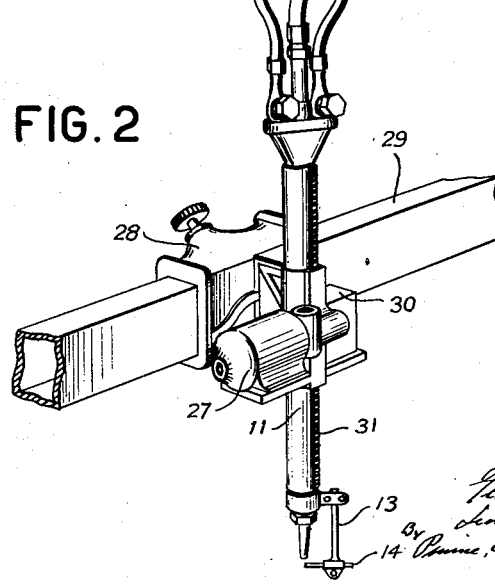

The improved method, and apparatus embodying the invention and that is suitable for use in carrying out the method, are illustrated in the accompanying drawing, in which:

Figure 1 is a simplified schematic diagram of a system embodying the invention; and Fig. 2 is a perspective view of an apparatus embodying the invention.

Referring to Fig. 1, a gas heating or cutting torch 11 is shown in operating position above a work-piece 12. A bracket 13 near the lower end of the torch 11 supports a tungsten rod 14 that extends into the path of the flame from the torch. The work-piece 12 is grounded. The bracket 13 is connected by a conductor 15 to one side of two potentiometers 18 and 19 connected in parallel with each other. The other side of the parallel potentiometers is connected to the negative terminal of a battery 16 or other source of electric potential. The positive terminal of the battery 16 is grounded, completing the circuit to the work-piece 12. A variable tap on the potentiometer 18 is connected to a resistance 20 which is connected in series with the control grid of a Thyratron tube 21. A variable tap of the potentiometer 19 is similarly connected in series with a resistance 22 and the control grid of a Thyratron tube 23. The Thyratron filaments are supplied by a separate secondary filament winding on a transformer 24. The screen grids of the Thyratrons are grounded with the cathodes. The Thyratron plates are connected in series with relays 25 and 26 and a high voltage secondary of the transformer 24 as shown. The leads from the transformer primary are placed across an A. C. supply. The high voltage secondary is center tapped to ground.

A series, split-field, reversing motor 27 has field windings 28 and 29. One side of the motor armature winding is connected to one side of a power line. The other side of the motor has two leads, one from each field winding. Field winding 28 is connected to a relay contact 25a in series with a relay contact 26a and the opposite side of the power line. Field winding 29 is connected to a relay contact 25b in series with a relay contact 26b and the opposite side of the power line. Relay contacts 25a and 26a are normally closed, and contacts 25b and 26b are normally open.

Fig. 2 illustrates apparatus embodying the invention and having the torch 11 supported by an adjustable bracket 28 on a bar 29 of a folding parallelogram universal cutting machine. The electronic control circuits are enclosed in a housing 30. The motor 27 is connected through reduction gears to a pinion engaging the rack 31 on the torch.

When the torch 11 is lit, the tungsten rod 14, in the path of the flame, is heated and emits electrons. Current then flows from the battery 16 (Fig. 1) through the parallel potentiometers 18 and 19, through the conductor 15, bracket 13, the tungsten rod 14, the flame, and the work-piece 12 to ground, completing the circuit to the positive side of the battery 16. The settings of the variable taps on the potentiometers 18 and 19 are negative with respect to ground. The cathodes of the Thyratrons are grounded. Then when plate voltage is applied to the Thyratrons by the high voltage secondary of the transformer 24 the tubes can be rendered conductive or non-conductive by the settings of the potentiometers. The current path when a tube 21 or 23 is fired is from ground, through the tube, through the relay 25 or 26, through one half of the transformer high voltage secondary, and out the center tap thereof to ground.

Potentiometer 18 is set to keep the tube 21 cut off when the torch is properly spaced. Potentiometer 19 is set to keep the tube 23 firing. Under these conditions relay 25 is de-energized, contact 25a is closed and 25b is open. Relay 26 is energized, contact 26a is open and 26b is closed. Thus the a motor circuit is open at 26a and the b circuit is open at 25b and the motor is de-energized.

When the torch spacing increases, the resistance of the torch flame between the tungsten rod 14 and the work-piece 12 increases, and the potentials at the potentiometer taps become more negative with respect to ground. This has no effect on tube 21 which remains cut off, nor on relay 25. However, tube 23 is cut off by the change in potential, relay 26 is de-energized, contact 26a is closed, and contact 26b is opened. The b motor circuit is now open at 25b and 26b. The a motor circuit is now closed allowing current to flow through field winding 28 of the motor 27 causing rotation of the motor in a direction to move the torch toward the work-piece and restore the optimum spacing.

When the torch spacing becomes less than the optimum, the grids of the tubes become less negative, both tubes fire and both relays are energized. This opens the a motor circuit at 25a and 26a and closes the b motor circuit through field winding 29 causing corrective rotation opposite to the above.

There are many other ways of using variation in the electrical resistance between the torch and work to indicate or correct torch spacing and the circuit herein described is merely illustrative. The important feature of the invention is the inclusion of the tungsten rod or other electron emissive element in the torch flame at the space to be controlled. This practically eliminates or renders negligible the effect on the flame conductivity of all variable other than the distance between the torch tip and the work-piece, and therefore makes an electrical control system of the kind described entirely practical and reliable.

It is claimed:

1. The method of controlling the spacing of a torch tip from the surface of a work-piece which comprises positioning an electron emissive element in fixed relation to the torch tip and in the torch flame so that when heated by the flame it will emit electrons, passing an electric current through the flame and between said element and the work so that an electron stream is produced between said element and the work which lowers the electrical resistance of the portion of the flame between the electron emissive element and the work, and moving the torch tip toward and away from the work surface in accordance with changes in the electrical conductivity of said portion of the flame.

2. The method of controlling the spacing of a torch tip from the surface of a work-piece which comprises mounting an electron emissive element on the torch so that a portion of it projects into the torch flame and will be heated thereby to cause electrons to be emitted, passing an electric current through the flame and between said element and the work so that an electron stream is produced between said element and the work which lowers the electrical resistance of the portion of the flame between the electron emissive element and the work, and moving the torch tip toward and away from the work surface in accordance with changes in the electrical conductivity of said portion of the flame.

3. Apparatus for controlling the spacing of a torch tip from the surface of a work-piece comprising electrically-actuated means for moving the torch tip towards and away from the work-piece, an element adapted to emit electrons when heated, means for supporting said element from the torch so that a portion of it projects into the flame from the torch and will be heated thereby, means for passing an electric current through a flame from the torch and between said element and the work-piece, and electrical control means responsive to a variance of the resistance between the electron-emissive element and the work-piece for causing operation of the electrically-actuated means.

LEONARD G. BROWN,
*Administrator of the Estate of George M. Deming, Deceased.*

REFERENCES CITED

The following references are of record in the file of this patent:

UNITED STATES PATENTS

| Number | Name | Date |
|---|---|---|
| 2,127,977 | Lamb | Aug. 23, 1938 |
| 2,364,645 | Mott et al. | Dec. 12, 1944 |
| 2,411,737 | Klinke | Nov. 26, 1946 |
| 2,438,344 | Meincke | Mar. 23, 1948 |